United States Patent
Gonzalez Gallegos

(10) Patent No.: US 9,366,589 B2
(45) Date of Patent: Jun. 14, 2016

(54) SENSOR FOR MEASURING MECHANICAL STRESS WHICH CAN BE ADAPTED TO CABLES WITH DIFFERENT GAUGES

(75) Inventor: Rafael Gonzalez Gallegos, Madrid (ES)

(73) Assignee: Dinacell Electronica, SL, Madrid (ES)

( * ) Notice: Subject to any disclaimer, the term of this patent is extended or adjusted under 35 U.S.C. 154(b) by 69 days.

(21) Appl. No.: 14/350,995

(22) PCT Filed: Feb. 1, 2012

(86) PCT No.: PCT/ES2012/000023
§ 371 (c)(1),
(2), (4) Date: Apr. 10, 2014

(87) PCT Pub. No.: WO2013/053960
PCT Pub. Date: Apr. 18, 2013

(65) Prior Publication Data
US 2014/0290388 A1 Oct. 2, 2014

(30) Foreign Application Priority Data
Oct. 11, 2011 (ES) .................................. 201131633

(51) Int. Cl.
*G01L 1/26* (2006.01)
*G01L 5/10* (2006.01)

(52) U.S. Cl.
CPC . *G01L 1/26* (2013.01); *G01L 5/102* (2013.01); *G01L 5/107* (2013.01)

(58) Field of Classification Search
CPC ............ G01L 1/26; G01L 5/102; G01L 5/107
USPC ............. 73/828, 829, 831, 862.391, 862.393, 73/862, 393
See application file for complete search history.

(56) References Cited

U.S. PATENT DOCUMENTS

| | | | | |
|---|---|---|---|---|
| 4,587,855 A * | 5/1986 | Yamada | .................... | G01L 5/10 73/862.451 |
| 4,989,450 A * | 2/1991 | Shoberg | .................. | G01L 5/107 73/1.15 |
| 4,992,778 A * | 2/1991 | McKeen | .................. | B66C 15/00 116/212 |
| 6,503,163 B1 * | 1/2003 | Van Sant | ............ | G02B 26/0816 348/E13.005 |
| 7,424,832 B1 * | 9/2008 | Nunnelee | ................ | G01L 5/107 73/862.472 |
| 2005/0087731 A1 * | 4/2005 | Scott | ........................ | B66D 1/52 254/283 |
| 2007/0205405 A1 * | 9/2007 | Stockmaster | ............ | B66D 1/38 254/275 |
| 2011/0077115 A1 * | 3/2011 | Dunn | ..................... | B65G 23/44 474/138 |
| 2014/0243841 A1 * | 8/2014 | Cavallazzi | ......... | A61B 17/8869 606/103 |

* cited by examiner

*Primary Examiner* — Max Noori
(74) *Attorney, Agent, or Firm* — Ladas & Parry LLP

(57) ABSTRACT

The invention relates to a sensor for measuring mechanical stress which can be adapted to cables with different gauges, made up of a body with a machined area for a strain gauge and three pivots—an upper, a lower and a central pivot—which are distributed on the front surface, the upper pivot being stationary and the lower pivot being retractable, which has a central pivot attached to the body via a movable attachment which, in a mechanical manner, enables horizontal movement thereof towards either side of the body, adapting to the gauge of the cable. The movable attachment is an attachment plate to which the central pivot is connected by a thread inserted on a screw, provided at the center of the body, in a recess having front and rear openings. The screw passes through the body from side to side in the recess and is attached by a nut.

4 Claims, 2 Drawing Sheets

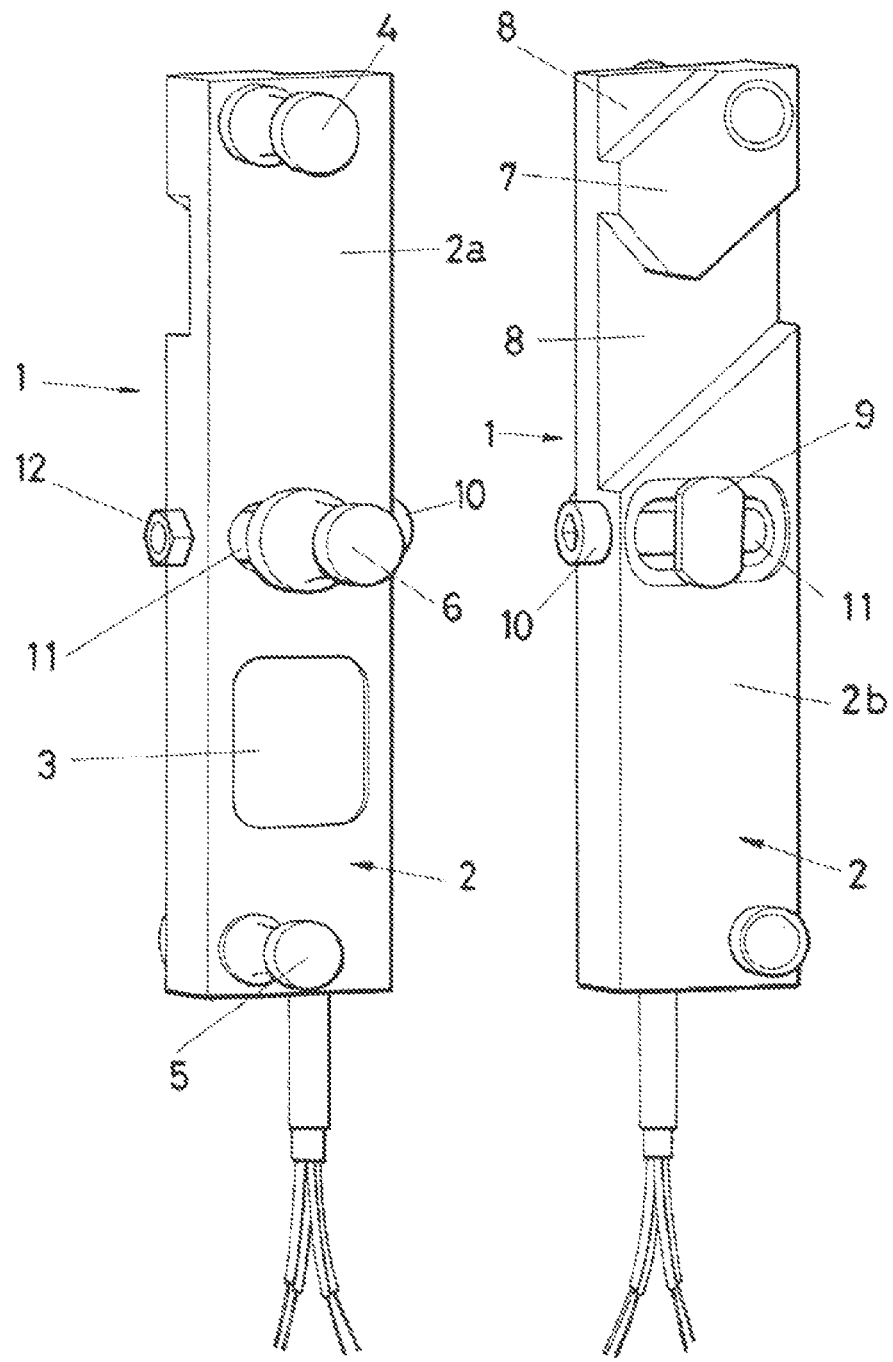

SENSOR FOR MEASURING MECHANICAL STRESS WHICH CAN BE ADAPTED TO CABLES WITH DIFFERENT GAUGES

This application is a 371 of International Application PCT/ES2012/000023 filed 1 Feb. 2012 entitled "Sensor For Measuring Mechanical Stress Which Can Be Adapted To Cables With Different Gauges", which was published on 18 Apr. 2013, with International Publication Number WO 2013/053960 A1 and which claims priority from Spanish Patent Application P201131633, filed 11 Oct. 2011, the content of which is incorporated herein by reference.

PURPOSE OF THE INVENTION

As indicated in the title of the present description, the invention involves a mechanical stress measurement sensor that is adaptable to cables of various calibres. It thus represents a notable innovation in its field of application, since it contributes numerous advantages for its intended function, together with novel characteristics inherent to its configuration and organisation, which shall be discussed in further detail below and which represent a significant improvement over the products currently known to the market.

More specifically, the purpose of the invention is based on a sensor that measures mechanical stress in cables by using extensiometric cells or gauges in order to determine the amount of stress being placed on cables hoisting masses (as in the case of cranes or lifting devices). The new sensor has the innovative particularity of being structurally configured so that the support points to which the measured cables are attached can adapt to the particular calibre in each case, adapting to it in order to measure the stress and thus avoiding the need to have to modify the cell parameters in each case in order to adapt them to the thicknesses of the different cables being measured.

FIELD OF APPLICATION OF THE INVENTION

This invention is applicable in the technical sector of the measurement device production industry, within the specific specialisation of devices for measuring mechanical stress in cables.

BACKGROUND OF INVENTION

There are currently various types of mechanical stress measurement sensors on the market. Thus the applicant also holds Spanish Patent No. 200102474 (publication no. ES2187298) involving a "Perfected sensor for measuring mechanical stress in cables," which, in general terms, consists of a body with an extensiometric cell and three support points through which the cable passes through tightly, pressing on the cell. Furthermore, the applicant is also the holder of Patent of Addition no. 200402269 (publication no. ES2285879), which patented improvements to the previous patent, with the support points to which the cable is attached being retractable to make it easier to insert the cable.

This invention arose from the need to solve the problem presented by these sensors, in which the width of the cable being measured needs to be calibrated, because when the cable is inserted on the cell, the cable puts initial pressure on the cell as a result of it being inserted. This pressure varies depending on the cable's thickness, since the amount of force needed to insert a 10 mm cable is not the same as for a 0.5 mm cable.

Therefore for example, when using these types of sensors to measure the various cables in a lifting device, operators have the inconvenience of having to continuously modify the data for the cell each time they measure a cable in order to establish its calibre as the new "zero" for measuring with the cable under stress.

Moreover, it should also be noted that the applicant is unaware of the existence of any other type of sensor for measuring mechanical stress in cables that has similar technical, structural and constituent characteristics to the sensor being proposed here, the characteristic details of which are duly summarised in the final claims included with the present description.

EXPLANATION OF THE INVENTION

The specific proposal of this invention is a sensor for measuring mechanical stresses that is adaptable to cables of various calibres; i.e., it is configured so that the support points between which the measured cable is suspended can adapt themselves to its calibre, adapting to it so that the measurement can be taken without having to modify the cell's parameters with each new cable thickness.

To do this, the sensor is configured as indicated in the aforementioned published patents, using a body with impeller trimming with a pre-determined width for housing the corresponding extensiometric cell or gauge and which is equipped with three pivots or drums that act as the support points for the cable, which would be connected to the sensor. These pivots are all located on the same side of the sensor, emerging from the device's side at a right angle and distributed in a staggered pattern along its length, so that they are offset from the longitudinal axis of the body; i.e., two on the upper and lower ends offset to one side, and the third one in the centre, offset to the other side.

Each pivot is channeled with a groove at its free end, through which the stressed cable passes.

Thus the load causes the cable to be subject to variable stress, which acts on the pivots, which in turn transfer the bending effect to the sensor body. This causes the extensiometric gauge to create the corresponding signal that can be interpreted to assess the intensity of the load.

Moreover, one of the pivots (more specifically, one of the ones at the ends) is mobile, and can be retracted forwards or backwards so that it can be hidden during the first phase of installing the sensor in the cable and then later returned to its forward operating position.

Furthermore, part of the back side of the invention's sensor body has a separate portion of area defined by two separate upper and lower grooves, whose size and configuration are designed for inserting conventional tools such as a wrench or a socket wrench that can be used to help create a lever effect when rotating the sensor body in order to better fit the cables in the pivots.

Lastly, the sensor assembly can be fit into an adaptable protective box that can be attached to the sensor body by pressing on it.

Therefore, according to the present invention, the sensor is unique in that of its cable-holding pivots, the central one mechanically adjusts to the thickness of the cable in order to measure it correctly. The pivot is able to make this adjustment because it is attached to the body but can also be moved horizontally in both directions, thus adapting to whatever the cable's calibre may be, without having to force it.

In order to do this, the pivot is connected to the body with a mobile fastening system that also includes a nut to keep it in place and prevent parts from being lost, as well as a ruled part on the back of the sensor that makes it possible to check the position of the pivot and measure the calibre of the cable in each case.

The foregoing facts show that, as described above, the mechanical stress measuring sensor that is adaptable to cables with various calibres, represents an innovative creation with structural and constituent characteristics heretofore unknown in its field of application. This, together with its practical usefulness, make it worthy of the exclusive privileges being requested.

DESCRIPTION OF THE DRAWINGS

A set of illustrations has been included as an integral part of the present description, as an additional aid to help describe the sensor in the invention and to make it easier to understand its unique characteristics. These diagrams are illustrative but not limited to the following aspects:

FIG. 1 shows a frontal perspective of a model of the mechanical stress measurement sensor adaptable to cables with various calibres from the invention. It shows the sensor's parts and components, particularly the attached movable central pivot.

FIGS. 2 and 3 show two rear perspectives of the model of the sensor from the invention shown in FIG. 1. Here, the back side of the movable fixation of the central pivot can be seen, with FIG. 2 showing it without the ruled part that covers its back side, shown in FIG. 3.

PREFERRED EMBODIMENT OF THE INVENTION

Figure 3:
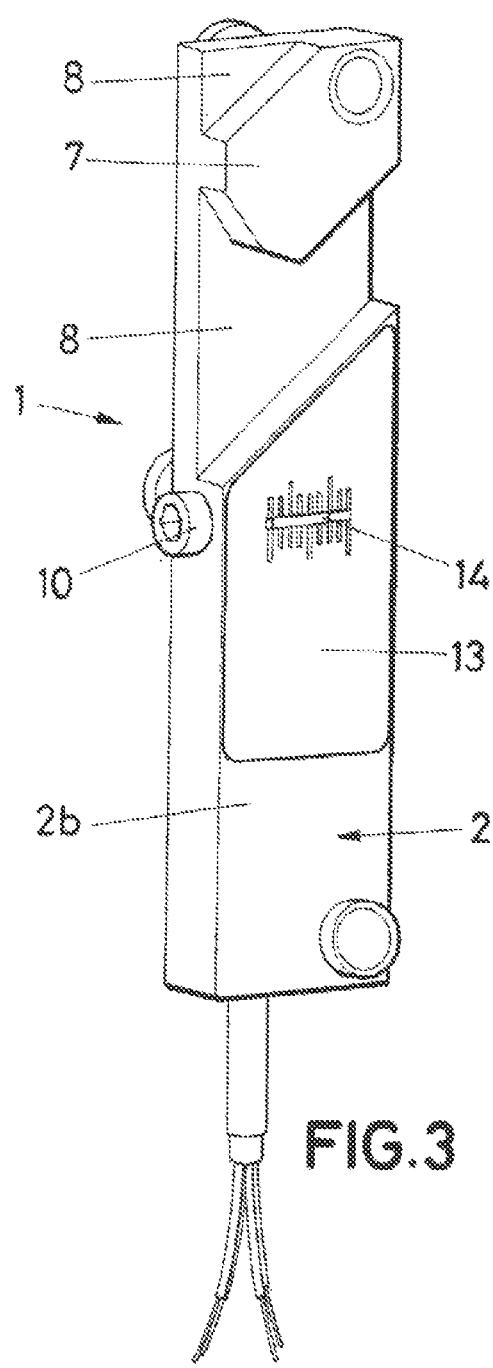
Figure 4:
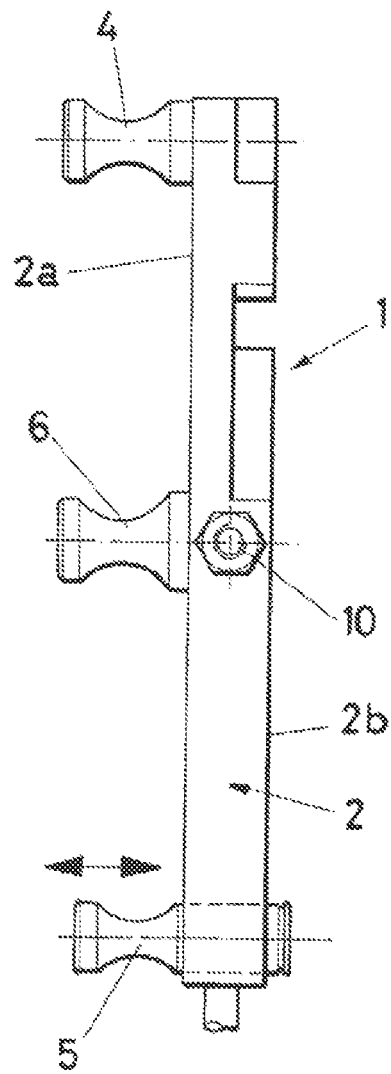
FIG. 4 shows an overhead side view of the sensor from the invention shown in the preceding figures.

In view of the aforementioned figures, and using the numbers used for them, they show an example of the preferred embodiment of the invention, which would consist of the parts and components listed in detail below.

Thus, as can be seen in the figures, the sensor (1) in question consists of body (2), the front side (2*a*) of which has been machined (3), in order to house the corresponding extensiometric cell or gauge and three pivots (4, 5, 6) that have been channeled for inserting the cable (not shown), which would need to be connected to the sensor to perform the measurement, while the back side (2*b*) has a part of its surface (7) separated with a pair of trimmings (8), whose size and configuration make it possible to insert a tool that can be used as a lever when inserting the cable into the pivots (4, 5, 6).

These pivots are distributed on the front side (2*a*) of the sensor's body, with the top pivot (4), which is fixed, and the bottom pivot (5), which is retractable and can be moved forward or backward, located respectively at the top and bottom of the front side (2*a*) and with both of them being arranged toward one edge of the front side, while the central pivot (6) is connected to the body (2) of the sensor with a movable fixation that makes it possible to move the pivot (6) mechanically toward either side of the body (2), in order to adapt it to whatever the calibre of the cable in question might be.

More specifically, the mobile fixation consists of a fastening base (9) to which it is connected and which can be screwed or unscrewed to move it horizontally on a screw (10) in which it is inserted and which in turn is inserted into a housing (11) created in the centre of the body (2) for such purposes; the housing has holes in its front and back sides for the insertion of the central pivot (6) in the front side and the fastening base (9) through its back.

Meanwhile, the screw (10) that crosses the body (2) horizontally from one side of the housing (11) to the other, is attached to the body (2) with a nut (12) that keeps it subjected externally.

Thus the central pivot (6) can be moved laterally to adapt it to the thickness of the cable in each case without having to force it.

It should be noted that, as shown in FIG. 3, on the fastening base (9), on the back side (2*b*) of the body (2), a part (13) with a hole (14) with ruled markings can be incorporated, through which the position of the fastening base (9) can be seen, making it possible to calibrate the thickness of the cable being measured by adjusting the central pivot (6) to it.

Having sufficiently described the nature of the present invention and how it should be used, no further explanation should be needed for any expert in the field to understand its scope and the advantages it provides, aside from noting that as part of its essential character, it may also be used in other embodiments besides the one indicated here as an example, and which would also include the protector, provided that doing so would not entail altering, changing or modifying the device's fundamental principle.

The invention claimed is:

1. Sensor for measuring mechanical stress, adaptable to cables with various calibres, being of the type configured based on a body (2) that has been machined (3), for extensiometric cells or gauges, with mechanical pivots distributed across the front side of the body located at the top (4), bottom (5) and centre (6), of the body and acting as the supports for the cable being measured upper pivot (4) being fixed and the lower pivot (5) being retractable, characterized in that the central pivot (6) is connected to body (2) by means of a movable fixation such that the central pivot (6) is capable of mechanical movement towards either side of the body perpendicularly to the cable mounted along the body, the three pivots guiding the cable into a "V" shape while adjusting to the calibre of the cable being measured.

2. Sensor according to claim 1, characterized in that the movable fixation that allows the central pivot (6) to move perpendicular to the cable is a fastening base (9) to which the central pivot (6) is connected by a threaded member moving over a screw (10) inserted into the threaded member within a housing (11) built in the centre of the body (2), there being orifices on the front and back sides of the housing for the insertion of the central pivot (6) in its front end and the fastening base (9) at the back.

3. Sensor according to claim 2, characterized in that the screw (10) passes through the body (2) from one side of the housing (11) to the other side of the housing perpendicular to the direction of the cable mounted on the body and is attached to the body (2) by means of a nut (12).

4. Sensor according to claim 2, characterized in that fastening base on the back side (2*b*) of the body (2) HAS a space for attaching member (13) equipped with a hole (14) with ruled markings through which the position of the fastening base (9) can be viewed.

\* \* \* \* \*